United States Patent
Satorius et al.

Patent Number: 5,838,441
Date of Patent: Nov. 17, 1998

[54] WIDE FIELD OF VIEW COHERENT LIGHT DETECTOR AND LOCATOR

[75] Inventors: Duane Satorius, Silver Spring, Md.; Timothy Eugene Dimmick, Glenville, Pa.

[73] Assignee: The United States of America as represented by the National Security Agency, Washington, D.C.

[21] Appl. No.: 899,062

[22] Filed: Jul. 23, 1997

[51] Int. Cl.[6] .................................................... G01B 9/02
[52] U.S. Cl. ........................................ 356/351; 356/345
[58] Field of Search ..................................... 356/351, 345

Primary Examiner—Frank G. Font
Assistant Examiner—Andrew Lee
Attorney, Agent, or Firm—Robert D. Morelli

[57] ABSTRACT

The present invention is a wide field of view electro-optic detector and locator of coherent light of unknown wavelength that includes a collecting optic that collimates incoming optical radiation, a common-path electro-optic polarization interferometer placed at an exit pupil plane, an imaging optic, a detector array placed one focal length away from said imaging optic, an image processor that processes the incoming signal in a manner that is independent of the phase of the modulation signal, and an output device. The preferred collecting optic includes a first lens, a field lens, and a collimating lens. The preferred interferometer includes a first polarizer, a liquid crystal variable phase modulator, a fixed phase retarder, and a second polarizer.

19 Claims, 4 Drawing Sheets

WIDE FIELD OF VIEW COHERENT LIGHT DETECTOR AND LOCATOR

FIELD OF THE INVENTION

The present invention relates to optical measuring and testing and, more particularly, to the detection and location of temporally coherent radiation.

BACKGROUND OF THE INVENTION

A wavetrain of radiation (e.g., light) which preserves its phase is called time-coherent, temporally coherent, or coherent. Coherence is the property wherein corresponding points on a wavetrain of light are in phase. Coherent light may be visualized as an ideal wavetrain whose spatial and time properties are clearly defined and predictable.

A wavetrain of light which does not preserve its phase is called time-incoherent or non-coherent. Ordinary non-coherent light consists of random and discontinuous phases of varying amplitudes. Non-coherent light has an average intensity and a predominant wavelength, but it is basically a superposition of different light waves. Most sources of light are non-coherent.

A laser (Light Amplification by Stimulated Emission of Radiation) produces coherent light. A laser may be constructed to produce coherent light of any wavelength within the spectrum of light (i.e., ultraviolet, near ultraviolet, visible, near infrared, infrared, and far-infrared). Coherent light may be used for measuring spatial parameters, heating material, removing material, probing resonant phenomena, communicating, processing optical signals, inducing a chemical reaction, and so on.

Many optical detectors use some type of interferometer. Interferometers may be grouped into one of two categories (i.e., non-common path interferometers and common-path interferometers). Non-common-path interferometers split the incoming light beam into two separate beams that follow two separate paths. The two beams are later recombined. Examples of non-common path interferometers include the Michelson interferometer and the Mach-Zender interferometer. Common-path interferometers split the incoming light beam into two beams that follow one path. Non-common path interferometers are not popular for field use because they are sensitive to vibration while common-path interferometers are much less susceptible to vibration. The present invention includes a common-path interferometer.

The prior art most relevant to the present invention appears to be U.S. Pat. Nos. 4,735,507 and 5,245,408, which are both hereby incorporated by reference into the specification of the present invention. U.S. Pat. No. 4,735,507, entitled "IMAGING COHERENT RADIOMETER," discloses a mechano-optic coherent light detector while U.S. Pat. No. 5,245,408, entitled "ELECTRO-OPTIC COHERENT LIGHT DETECTOR," improves upon U.S. Pat. No. 4,735,507 by, essentially, replacing the mechano-optic modulator with an electro-optic modulator. U.S. Pat. No. 5,245,408 achieves greater signal gain than does U.S. Pat. No. 4,735,507. Also, U.S. Pat. No. 5,245,408 can detect coherent light at levels that cannot be detected by U.S. Pat. No. 4,735,507. Furthermore, U.S. Pat. No. 5,245,408 is faster and more reliable than U.S. Pat. No. 4,735,507 because U.S. Pat. No. 5,245,408 operates electronically rather than mechanically.

The present invention is an improvement over both U.S. Pat. Nos. 4,735,507 and 5,245,408. The present invention has the same advantages over U.S. Pat. No. 4,735,507 as does U.S. Pat. No 5,245,408. Furthermore, the present invention has advantages over U.S. Pat. No. 5,245,408 that include having a much wider field of view, being able to locate within the viewed field any coherent light that may be present, and processing the incoming signal in a manner that is independent of the phase of the modulation signal. U.S. Pat. No. 5,245,408 is only capable of detecting a single point of coherent light while the present invention may detect coherent light in a field of view approaching 180 degrees. By detecting only a single point of coherent light, U.S. Pat. No. 5,245,408 is unable to view a wider field absent physically moving U.S. Pat. No. 5,245,408 from point to point in a given field (a laborious and time consuming proposition) and cannot superimpose the location of any coherent light detected onto the viewed field.

U.S. Pat. No. 5,245,408 includes a collecting optic, a polarization interferometer, a focusing optic, a single detector, and a processor. Incoming light is received by the collecting optic. Light exiting the collecting optic enters a polarization interferometer. The polarization interferometer includes a polarizer (i.e., a first polarizer), a birefringent modulator, and an analyzer (i.e., a second polarizer). The modulator has an x-axis, a y-axis, and a z-axis that are coincident with its principle axes. The x-axis is aligned to the propagation path of the incoming light. The first polarizer is oriented forty-five degrees to the z-axis of the modulator. The polarized light exiting the first polarizer may be broken down, or split, into two components. That is, a y-axis component consisting of light propagating along the x-axis where the light is polarized in the y-axis and a z-axis component consisting of light propagating along the x-axis where the light is polarized along the z-axis. Light exiting the first polarizer enters the modulator which is controlled by a sinusoidal signal. The sinusoidal signal acts to vary the optical path length for light polarized along either the y-axis or z-axis or both such that the difference in the optical path lengths for these two polarization states is modulated. To distinguish coherent light from incoherent light, the thickness of the modulator is set so that the difference in the optical path length of the z-axis polarized component and the y-axis polarized component is greater than the coherence length of incoherent light but less than the coherence length of coherent light. Light exiting the modulator is recombined by the analyzer. The analyzer is oriented forty-five degrees to the z-axis. The analyzer acts to combine x-axis polarized light with z-axis polarized light so that any coherent light present is amplitude modulated while any incoherent light present is not. The focusing optic and the detector array act to convert the optical signal exiting the analyzer into an electrical signal that can be processed by the processor using a down-conversion method that uses sine functions based on the modulation signal.

The field of view of U.S. Pat. No. 5,245,408 is severely limited by the height-to-length ratio of the birefringent modulator which is much less than one. The field of view of the present invention is greatly increased over that of U.S. Pat. No. 5,245,408 by increasing the height-to-length ratio of the optical path length through the combination of a variable phase modulator and a fixed phase retarder to as large as possible based on the state of the art of the components involved. In the present invention, the variable phase modulator is realized by a liquid crystal modulator. By using a liquid variable phase modulator the height to length ratio may be maximized. Also, the image processing employed in U.S. Pat. No. 5,245,408 is dependent on the phase of the modulation signal because only sine functions based on the modulation signal are used in the processor.

The image processing of the present invention is independent of the phase of the modulation signal because both sine and cosine functions based on the modulation signal are used in the image processor.

Other prior art relevant to the present invention appear to fall into two categories. That is, devices that detect a select wavelength of coherent light, or a group of wavelengths of coherent light, and devices that do not discriminate between coherent and non-coherent light. Neither of these types of device perform as well as the present invention.

Devices that detect one or more wavelengths of coherent light include one or more filters to filter out unwanted wavelengths of light. Examples of such devices are U.S. Pat. Nos. 4,624,563, entitled "WIDE FIELD OF VIEW REMOTE LASER POSITION SENSOR"; 4,626,100, entitled "WIDE FIELD OF VIEW TWO-AXIS LASER LOCATOR"; 4,835,381, entitled "WIDE FIELD OF VIEW RADIANT ENERGY RECEIVER"; 5,506,678, entitled "SYSTEM FOR COLLECTING WEAKLY SCATTERED ELECTROMAGNETIC RADIATION"; 5,243,179, entitled "LASER WARNING DEVICE WITH DIVIDING AND FILTERING OF THE INCIDENT BEAM"; 5,040,891, entitled "LASER-WARNING METHOD AND APPARATUS"; and 5,040,892, entitled "METHOD AND APPARATUS FOR DETERMINING THE DIRECTION TO A LASER BEAM SOURCE." Prior art that includes a filter to detect only certain wavelengths of coherent light cannot detect the whole spectrum of coherent light as the present invention can. Therefore, detectors that include a filter are blind to some coherent light that the present invention is not. Being able to see the entire spectrum of coherent light is important for a detection system that does not know beforehand what wavelength of coherent light is present.

Devices that do not discriminate between coherent and non-coherent light include U.S. Pat. Nos. 3,670,168, entitled "LIGHT DIRECTION SENSOR"; 3,858,201, entitled "HIGH ANGULAR RESOLUTION SENSOR"; 4,181,435, entitled "HOLOGRAPHIC FIELD LENS DETECTOR"; 4,185,919, entitled "QUADRANT DETECTION SYSTEM"; 3,634,691, entitled "APPARATUS AND METHOD FOR SENSING RADIANT ENERGY AND DETERMINING THE POSITION OF THE SOURCE"; 4,710,619, entitled "APPARATUS FOR GENERATING A SIGNAL PROVIDING INFORMATION REGARDING A RADIATING SOURCE, ESPECIALLY AN INFRARED SOURCE"; 4,946,277, entitled "OPTO-ELECTRONIC DEVICE FOR DETECTING AND LOCATING A RADIANT SOURCE"; 4,315,690, entitled "ARRANGEMENT FOR LOCATING RADIATING SOURCES"; 4,325,633, entitled "APPARATUS FOR DETERMINING OF ANGLE OF INCIDENCE OF ELECTROMAGNETIC ENERGY"; 3,147,384, entitled "FLASH DETECTION AND LOCATION SYSTEM"; 3,602,903, entitled "OPTICAL SENSING SYSTEM FOR DETECTING AND STORING THE POSITION OF A POINT SOURCE TARGET"; 4,314,761, entitled "ARRANGEMENT FOR LOCATING RADIATING SOURCES"; and 4,006,356, entitled "RADIANT ENERGY TRACKING DEVICE," which are hereby incorporated by reference into the specification of the present invention. These patents detect both coherent and non-coherent light but do not distinguish between coherent or non-coherent light. Therefore, these patents do not disclose the same device as the present invention and cannot detect the spectrum of coherent light as does the present invention.

SUMMARY OF THE INVENTION

It is an object of the present invention to detect and locate coherent light of any wavelength within a wide field of view.

It is another object of the present invention to detect and locate coherent light of any wavelength within a wide field of view in the presence of non-coherent light, where the intensity of any non-coherent light present may greatly exceed the intensity of any coherent light present.

It is another object of the present invention to detect and locate coherent light of any wavelength within a wide field of view in a manner that is not dependent on the phase of the modulation signal.

The objects of the present invention are achieved by a device that includes, in series, a collecting optic, a common-path electro-optic polarization interferometer, an imaging optic, a detector array, an image processor, and an output device. The interferometer includes, in series, a first polarizer, a variable phase modulator, a fixed phase retarder, and a second polarizer. Incoming radiation (e.g., light) is received in the collecting optic along an optical propagation axis (e.g., the x-axis of the fixed phase modulator). The order of the variable phase modulator and the fixed phase retarder does not matter.

The collecting optic collimates the incoming light. In the preferred embodiment, the collecting optic includes, in series, a first lens for receiving the incoming signal, a field lens, and a collimating lens. The field lens is used to maximize the field of view by preventing the incoming light from diverging beyond the aperture of the collimating lens.

The collimated incoming light then enters the common-path electro-optic polarization interferometer. The principle axes of the variable phase modulator and the fixed phase retarder are oriented in the same manner as is the modulator in U.S. Pat. No. 5,245,408 for the same reasoning as described therein but with some improvements. The first improvement is to center the interferometer of the present invention at the exit pupil plane of the collecting optic in order to maximize processing gain. The second improvement is to increase the height-to-length ratio of the optical path length of the combination of the variable phase modulator and the fixed phase retarder to the maximum allowed by the present state of the art of the components involved in order to maximize the field of view. This is accomplished in part by employing a liquid crystal modulator as the variable phase modulator. The liquid crystal modulator has a height-to-length ratio far in excess of the modulators proposed in U.S. Pat. No. 5,245,408. That is, the height-to-length ratio is greater than one.

The light exiting the first polarizer is polarized at some user-definable angle between zero and ninety degrees, plus or minus, of the z-axis, or optic axis, of the fixed phase modulator. In the preferred embodiment, the first polarizer is oriented at forty-five degrees to the z-axis of the fixed phase modulator. The first polarizer performs the same function as the polarizer in U.S. Pat. No. 5,245,408. That is, the light exiting the first polarizer may be thought of as two components of light where the first component is polarized in the y-axis direction and propagates, nominally, along the x-axis and the second component of light is polarized along the z-axis and propagates, nominally, along the x-axis. Light from the center of the field of view propagates along the x-axis while light from the edges propagates off axis to some degree. The larger the field of view the more off-axis will be the light from the edges.

The two components of polarized light exiting the first polarizer then enter the variable phase modulator. A modulation signal (e.g., a sine function) is applied to the variable phase modulator in order to impose a different effective optical path length for the y-axis polarized component and the z-axis polarized component.

The light exiting the variable phase modulator then enters the fixed phase retarder. The fixed phase retarder shifts the phase of the light polarized along the z-axis relative to the light polarized along the y-axis. The magnitude of the phase shift is determined by the thickness and birefringence of the fixed phase retarder and by the wavelength of the light.

In order to distinguish coherent light from incoherent light, the thickness of the variable phase modulator and the fixed phase retarder is set in accordance with how the thickness was set for the modulator in U.S. Pat. No. 5,245,408. That is, the thickness is chosen so that the minimum optical path length difference between the y-axis polarized component and the z-axis polarized component is longer than the coherence length of non-coherent light and shorter than the coherence length of coherent light.

The light exiting the fixed phase retarder is optically connected to a second polarizer. The second polarizer polarizes the light exiting the fixed phase retarder to some user-designable angle between zero and ninety degrees, plus or minus, of the z-axis of the fixed phase retarder. The second polarizer may be thought of as recombining the two components of light propagating along the x-axis (i.e., the y-axis polarized component and the z-axis polarized component). The resulting combination is linearly polarized light where the amplitude of any coherent light present is modulated while the amplitude of any non-coherent light present is unchanged.

By carefully selecting the height to length ratio of the optical path length of the combination of variable phase modulator and fixed phase retarder, a field of view approaching 180 degrees may be achieved. The ratio should be set to the maximum allowed by the state of the art of the included components. In the preferred embodiment, where the variable phase modulator is realized by a liquid crystal variable phase modulator, the ratio is set to greater than one. This is an improvement over U.S. Pat. No. 5,245,408.

The recombined optical signal exiting the second polarizer and, therefore, the interferometer, then enters an imaging optic. The optical signal exiting the imaging optic is then impressed upon the detector array. The detector array is placed one focal length away from the imaging optic. By using a detector array of W pixels wide and H pixels high, the present invention performs W×H times faster than an optical detector having only one detector such as U.S. Pat. No. 5,245,408.

The electrical signal exiting the detector array is then transmitted to the image processor. The image processor employs a processing method that includes sine and cosine functions based on the modulation signal applied to the variable phase modulator. The image processor detects the modulation imposed on any coherent light component by the interferometer while rejecting any modulation on any non-coherent light component. By including the sine and cosine functions, the image processor is made independent of the phase of the modulation signal. This is an improvement over U.S. Pat. No. 5,245,408 which only uses a sine function based on the modulation signal and is, therefore, dependent on the phase of the modulation signal.

The electrical signal exiting the image processor is then transmitted to an output device. The output device highlights any coherent light present and superimposes any coherent light detected on the viewed field so that the user may determine the physical location of the coherent light source, if any. This is an improvement over U.S. Pat. No. 5,245,408 which does not superimpose any detected signal over a wide field of view.

DETAILED DESCRIPTION

The present invention is a device for detecting and locating coherent radiation (e.g., light) of any wavelength within a wide field of view by processing incoming radiation in a manner that is independent of the phase of a modulation signal. The present invention operates even in the presence of strong non-coherent radiation.

Figure 1:
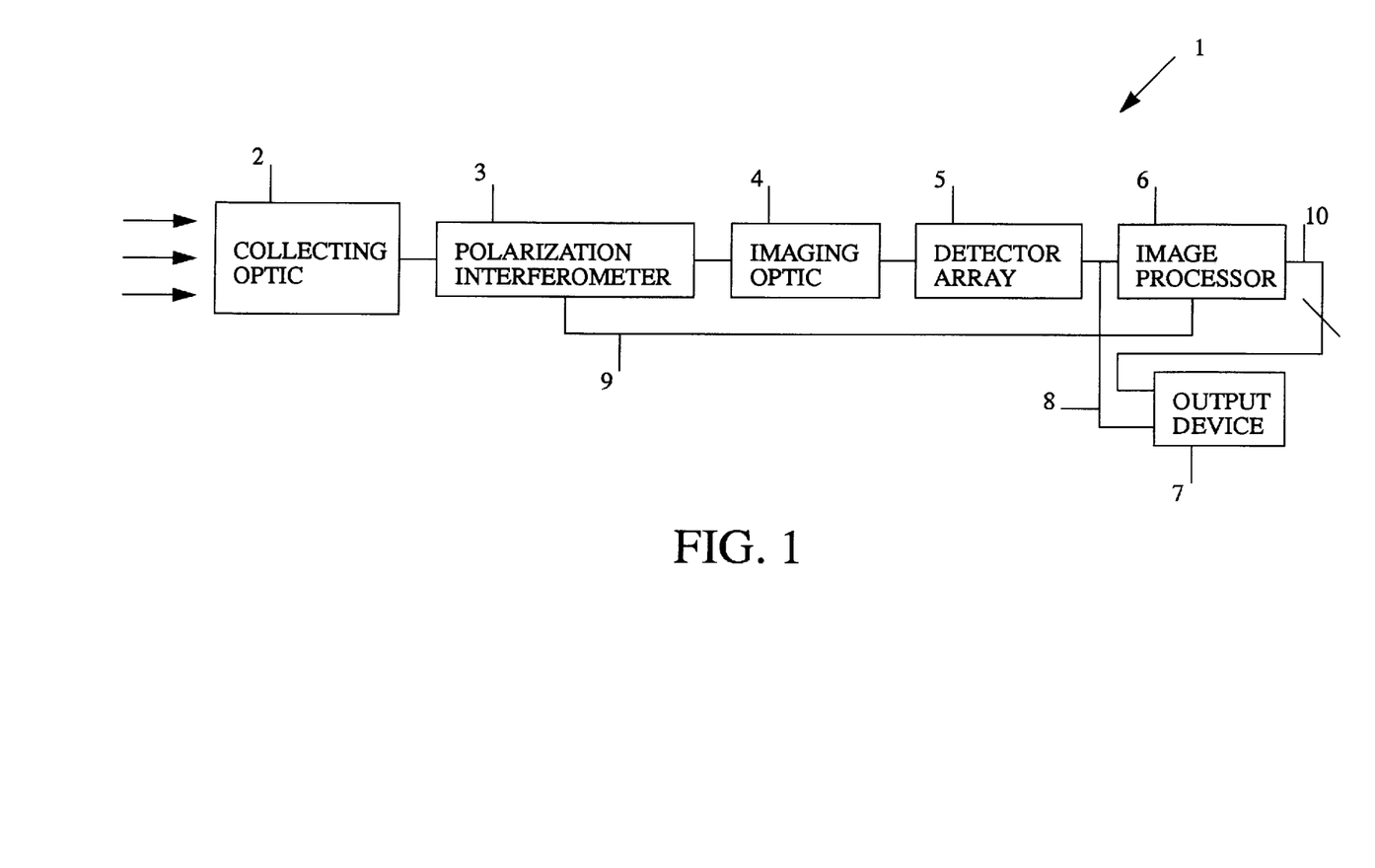
FIG. 1 is a block diagram of the present invention.

FIG. 1 is a block diagram of the coherent light detector 1 of the present invention which includes a collecting optic 2, an electro-optic polarization interferometer 3, an imaging optic 4, a detector array 5, an image processor 6, and an output device 7. The collecting optic 2, the electro-optic polarization interferometer 3, the imaging optic 4, and the detector array 5 are optically connected in series. An output 8 of the detector array 5 is electrically connected to an input of the image processor 6 and a first input of the output device 7. A first electrical output 9 of the image processor 6 is connected to an electrical input of the interferometer 3 in order to provide the modulation signal to the interferometer 3. The modulation signal is a sinusoidal signal. For discrete time, which is preferred, the modulation signal may be cos2πn/N, where n is the frame index and N is the number of frames per cycle. The present invention is not limited to this modulation signal and includes any sufficient modulation signal in discrete time or continuous time. A second electrical output 10 of the image processor 6 is a two-signal bus connection that is connected to a second electrical input of the output device 7. The functional details of the coherent light detector 1 are given below.

Incoming radiation to be processed by the coherent light detector 1 is received by the collecting optic 2. The collecting optic 2 receives an incoming optical signal with as wide a field of view as required for the particular application. Examples of devices that may be used as a collecting optic 2 include a single-element lens, a single-element mirror, a multi-element lens, and a multi-element mirror. The collecting optic 2 collimates the incoming radiation. Each lens in the collecting optic 2 is selected from the group consisting of a singlet-type lens, a doublet-type lens, and a triplet-type lens. One of the lenses may be located at, or near, an image plane.

Figure 2:
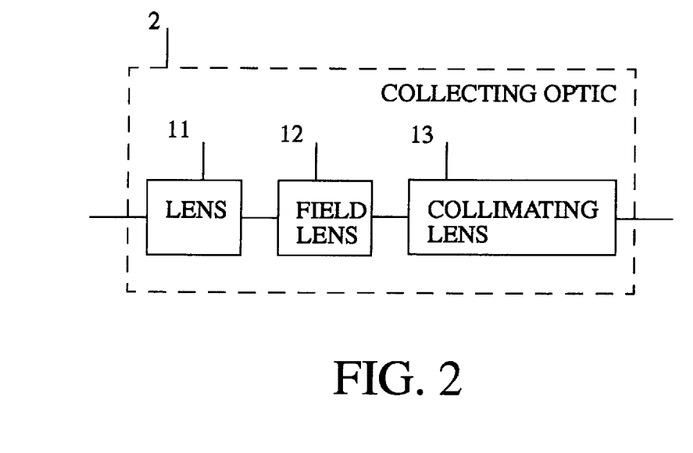
FIG. 2 is a block diagram of the collecting optic FIG. 1.

FIG. 2 is a block diagram of the preferred collecting optic 2 of the present invention. FIG. 2 includes a lens 11, a field lens 12, and a collimating lens 13 optically connected in series. A field lens 12, which is not found in U.S. Pat. No. 5,245,408, is used to increase the field of view of the present invention by preventing incoming light from diverging beyond the aperture of the collimating lens 13. The lack of a field lens 12 in U.S. Pat. No. 5,245,408 is one reason why its field of view is so narrow. The collimating lens 13 is used to collimate the incoming light as it propogates through the polarization interferometer 3 and insures the best discrimination between coherent and non-coherent light. Incoming light need not be collimated along the optical propagation axis (i.e., the x-axis of the interferometer 3).

Figure 3:
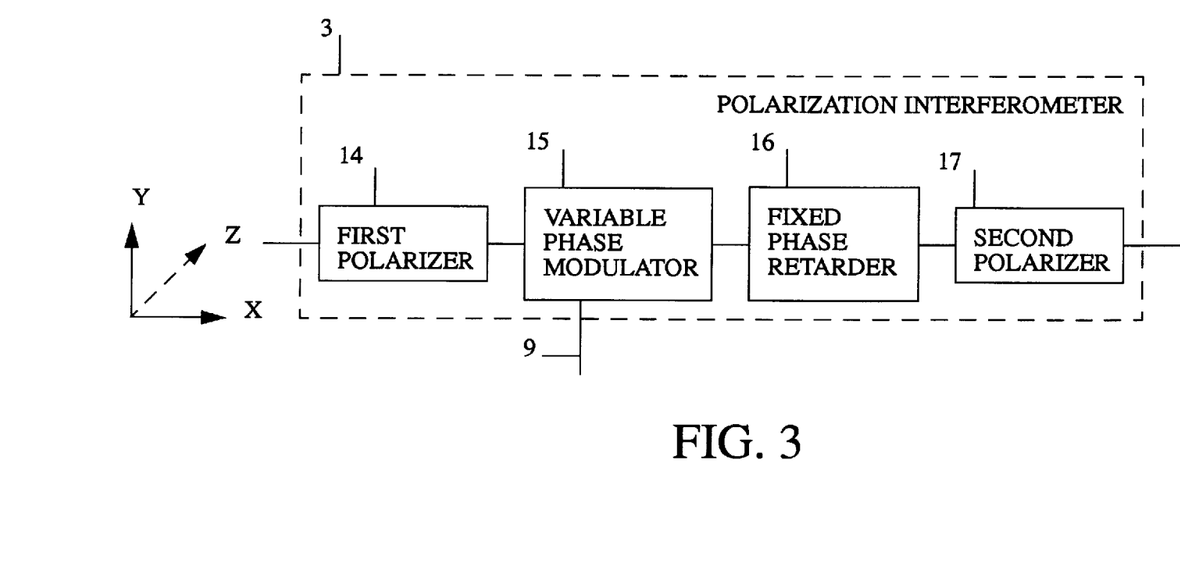
FIG. 3 is a block diagram of the interferometer of FIG. 1.

The collecting optic 2 is optically connected to a common-path electro-optic polarization interferometer 3. FIG. 3 is a block diagram of the preferred interferometer 3 which includes a first polarizer 14, a variable phase modulator 15, a fixed phase retarder 16, and a second polarizer 17 optically connected in series. The order of the variable phase modulator 15 and the fixed phase retarder 16 may be switched without any loss in functionality or performance. The components of the interferometer 3 are aligned according to the guidance disclosed in U.S. Pat. No. 5,245,408. The variable phase modulator 15 and the fixed phase retarder 16 each have an x-axis, a y-axis, and a z-axis that are coincident with the principle axes of the variable phase modulator 15 and the fixed phase retarder 16 and are parallel to each other, respectively. The first polarizer 14 and the second polarizer 17 are each oriented with respect to the z-axis of the fixed phase retarder 16. Incoming light propagates in the direction of the x-axis of the fixed phase retarder 16. The first electrical output 9 of the image processor 6 is connected to the first electrical input of the variable phase modulator 15.

The present invention improves upon U.S. Pat. No. 5,245,408 as follows. First, the interferometer 3 is centered at the exit pupil plane of the collecting optic 2 in order to maximize the processing gain of the present invention. Second, the height-to-length ratio of the optical propagation path (e.g., the x-axis) of the variable phase modulator 15 and the fixed phase retarder 16 is maximized according to the present state of the art of the included components in order to achieve a field of view approaching 180 degrees. For example, the height-to-length ratio of the optical propagation path through the variable phase modulator 15 and the fixed phase retarder 16 is greater than one. As a result of restrictions imposed by the choice of modulator, the same ratio in U.S. Pat. No. 5,245,408 is much less than one. Setting this ratio to less than one severely limits the field of view of the resulting device. More details concerning this ratio are given below.

The first polarizer 14 of the interferometer 3 may be chosen from the group consisting of a prism-based polarizer and a sheet-based polarizer. Examples of prism-based polarizers include Glan-Taylor polarizers and Glan-Thompson polarizers. Examples of sheet-based polarizers include dichroic sheet-polarizers. In the preferred embodiment, the first polarizer 14 is prism-based. The first polarizer 14 polarizes the light exiting from the collecting optic 2 to some user-designable angle between zero and ninety degrees, plus or minus, of the z-axis (i.e., the optic axis of the fixed phase retarder 16). The first polarizer 14 is oriented in accordance with the rational given in U.S. Pat. No. 5,245,408 for the orientation of the polarizer contained therein. Although the first polarizer 14 may be oriented between zero and ninety degrees, plus or minus, to the z-axis of the fixed phase retarder 16, in the preferred embodiment it is oriented forty-five degrees from the z-axis. The light exiting the first polarizer 14 and propagating along the x-axis with respect to the fixed phase retarder 16 may be resolved into two component parts (e.g., a y-axis component and a z-axis component). That is, the light exiting the first polarizer 14 may be thought of as consisting of a light component propagating along the x-axis and polarized in the y-axis direction and a light component propagating along the x-axis and polarized in the z-axis direction. The first polarizer 14 may be thought of as a beam splitter for the common-path interferometer 3.

The y-axis polarized component of light and the z-axis polarized component of the light exiting the first polarizer 14 then enters the variable phase modulator 15. The variable phase modulator 15 may be chosen from the group consisting of an electro-optic modulator, a liquid crystal electro-optic modulator, a magneto-optic modulator, and a rotating fixed retarder. In the preferred embodiment, the variable phase modulator 15 is an electro-optic liquid crystal phase modulator oriented in the same manner as the fixed phase retarder 16 and the modulator described in U.S. Pat. No. 5,245,408. That is, the variable phase modulator 15 is oriented so that its x-axis, y-axis, and z-axis are parallel with the x-axis, y-axis, and z-axis of the fixed phase retarder 16, respectively. A modulation signal based on a sinusoidal function is presented to the variable phase modulator 15 via the first electrical output 9 from the image processor 6. In the preferred embodiment, the modulation signal is in discrete time (e.g., $\cos 2\pi n/N$, where n is the frame index, and where N is the number of frames per cycle), but the present invention may employ any sufficient modulation signal including those in continuous time. The modulation signal changes the optical property of the variable phase modulator so that each component of polarized light emerging from the first polarizer 14 encounters a different effective optical path length through the variable phase modulator 15. That is, the difference in the optical path lengths through the variable phase modulator 15 of the z-axis polarized components and y-axis polarized components varies in accordance with the modulation signal. Sinusoidally operating the variable phase modulator 15 at a frequency 1/N produces significant signal components at frequencies 1/N, 2/N, or both, for coherent light but not for non-coherent light.

A wider field of view may be obtained by using a liquid-crystal phase modulator for the variable phase modulator 15 as opposed to some other type of phase modulator because the optical path (i.e., the length) through a liquid-crystal phase modulator may be small as compared to its lateral extent (i.e., its height). Therefore, the height-to-length ratio of the interferometer 3 and the field of view of the present invention may be maximized. Also, the electrodes of a liquid-crystal phase modulator are transparent and do not block optical signals as do non-transparent electrodes on other types of phase modulators.

The light exiting the variable phase modulator 15 is optically connected to a fixed phase retarder 16. The material used to make the fixed phase retarder 16 may be quartz, mica, calcite, lithium niobate, or any other optically transparent material with sufficient birefringence. The fixed phase retarder 16 is oriented in accordance with the orientation of the modulator of U.S. Pat. No. 5,245,408. That is, the principle axes of the fixed phase retarder 15 are parallel to the principle axes of the variable phase modulator 15. The fixed phase retarder 16 shifts the phase of the z-axis polarized component of light exiting the variable phase modulator 15 a user-designable amount relative to the y-axis polarized component of light. For a given wavelength and birefringence, the thickness of the fixed phase retarder 16 sets the amount by which the phase of the z-axis polarized component of light is shifted relative to the y-axis polarized component. As in U.S. Pat. No. 5,245,408, the thickness of the variable phase modulator 15 and the fixed phase retarder 16 should be set so that the optical path length difference between the y-axis polarized component and the z-axis polarized component is longer than the coherence length of non-coherent light and shorter than the coherence length of coherent light. The difference between these two optical path lengths sets the threshold at which incoming light is determined to be either coherent or non-coherent by exploiting the fact that the coherence length of coherent radiation is greater than the coherence length of non-coherent radiation.

The light exiting the fixed phase retarder 16 is optically connected to a second polarizer 17. The second polarizer 17 may be chosen from the same group from which the first polarizer 14 was selected (e.g., prism-based polarizer and a sheet-based polarizer). In the preferred embodiment, the second polarizer 17 is prism-based. The second polarizer 17 polarizes the light exiting the fixed phase retarder 16 to some user-designable angle between zero and ninety degrees, plus or minus, of the z-axis of the fixed phase retarder 16. The second polarizer 17 is oriented in accordance with the rational given in U.S. Pat. No. 5,245,408 for the orientation of the analyzer contained therein. Although the second polarizer 17 may be oriented between zero and ninety degrees, plus or minus, to the z-axis of the fixed phase retarder 16, in the preferred embodiment it is oriented forty-five degrees to the z-axis of the fixed phase retarder 16. The second polarizer 17 may be thought of as recombining the two components of light exiting the fixed phase retarder 16 in order to produce linearly polarized light where the amplitude of any coherent light present is modulated while the amplitude of any non-coherent light present remains unchanged.

By maximizing the height-to-length ratio of the optical path length of the variable phase modulator 15 and the fixed phase retarder 16, a coherent light detector 1 having a field of view approaching 180 degrees may be realized. The ratio of the height (or aperture size) to length of the above-identified components may be much greater than the height-to-length ratio of the modulator disclosed in U.S. Pat. No. 5,245,408. Since this ratio is directly related to field of view, the present invention may realize a much wider field of view than may be realized by U.S. Pat. No. 5,245,408. In the preferred embodiment of the present invention, the height-to-length ratio is maximized by using the best available components. For example, a liquid crystal modulator may be used as the variable phase modulator in order to maximize the height-to-length ratio. Practically, the ratio is set to a value greater than one. For example, the height may be one inch while the length may be less than one inch.

In FIG. 1, the output of the interferometer 3 is optically connected to the imaging optic 4. The imaging optic 4 may be selected from the group consisting of a single-element lens, a multi-element lens, a single-element mirror, and a multi-element mirror. Each lens may be singlet-type, doublet-type, or triplet-type. A field lens may also be used in the imaging optic 4. In the preferred embodiment, the imaging optic 4 is a multi-element lens.

The output of the imaging optic 4 is optically connected to the detector array 5. The detector array 5 is placed one focal length away from the imaging optic 4. The light emerging from the imaging optic 4 is imaged onto the detector array 5. The detector array 5 may be selected from the group consisting of a charged coupled device (CCD) array, a multi-element pin-diode array, and a multi-element fiber-optic array connected to individual optical detectors. A CCD array may be chosen to detect visible light (i.e., silicon based) or infrared light (e.g., GaAs based, InGaAs based, PtSi based, etc.). By using a detector array 5 rather than a single detector, as in U.S. Pat. Nos. 4,735,507 and 5,245,408, a performance improvement equal to the number of elements in the detector array 5 may be realized over a coherent light detector having only one detector. That is, for a detector array 5 of W elements wide and H elements high, the present invention performs W×H times faster than a coherent light detector having only one detector.

The output 8 of the detector array 5 is electrically connected to the image processor 6 and the output device 7. The image processor 6 uses both sine and cosine functions based on the modulation signal applied to the variable phase modulator 15 in order to down-convert the signal received from the detector array 5 in a manner that is independent of the phase of the modulation signal. This is an improvement over the method employed by U.S. Pat. No. 5,245,408 which uses only sine functions based on the modulation signal and is, therefore, dependent on the phase of the modulation signal.

The image processor 6 detects any coherent light component present in the incoming light by detecting modulation at a frequency 1/N or 2/N induced on any coherent light component present and rejecting any non-coherent light component which remains unmodulated.

Figure 4:
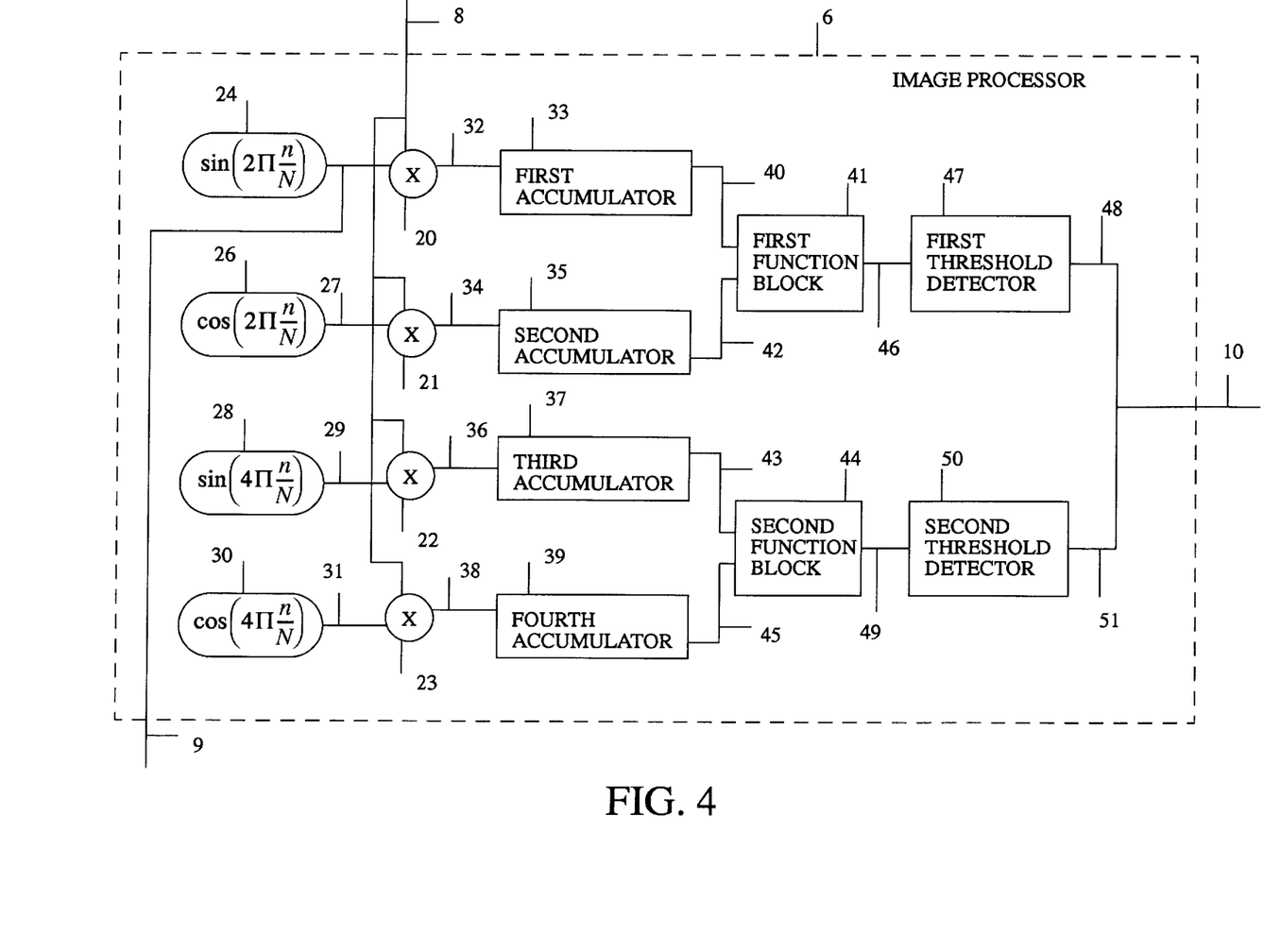
FIG. 4 is a schematic of the image processor of FIG. 1.

FIG. 4 is a schematic of the image processor 6 of the present invention. The electrical output 8 of the detector array 5 is connected to the first input of a first multiplier 20, a first input of a second multiplier 21, a first input of a third multiplier 22, and a first input of a fourth multiplier 23. A first signal source 24 based on the modulation signal (e.g., $\sin(2\pi n/N)$) is connected to a second input 9 of the first multiplier 20. The first signal source 24 also supplies the modulation signal to the variable phase modulator 15. A second signal source 26 based on the modulation signal (e.g., $\cos(2\pi n/N)$) is connected to a second input 27 of the second multiplier 21. A third signal source 28 based on the modulation signal (e.g., $\sin(4\pi n/N)$) is connected to a second input 29 of the third multiplier 22. A fourth signal source 30 based on the modulation signal (e.g., $\cos(4\pi n/N)$) is connected to a second input 31 of the fourth multiplier 23. An output 32 of the first multiplier 20 is connected to an input of a first accumulator 33. An output 34 of the second multiplier 21 is connected to an input of a second accumulator 35. An output 36 of the third multiplier 22 is connected to an input of a third accumulator 37. An output 38 of the fourth multiplier 23 is connected to an input of a fourth accumulator 39. Each accumulator 33, 35, 37, 39 adds the input from the multiplier 20, 21, 22, or 23 connected thereto to the sum of previous inputs from said multiplier 20, 21, 22, or 23. The outputs 32, 34, 36, and 38 of the multipliers 20, 21, 22, and 23 are accumulated for at least one complete cycle of the sinusoidal signal applied to the electrical input 9 of the variable phase modulator 15.

An output 40 of the first accumulator 33 is connected to a first input of a first function block 41. An output 42 of the second accumulator 35 is connected to a second input of the first function block 41. The first function block 41 generates the square root of the sum of the squares of the first input 40 and the second input 42 of the first function block 41. An output 43 of the third accumulator 37 is connected to a first input of a second function block 44. An output 45 of the fourth accumulator 39 is connected to a second input of the second function block 44. The function performed by the second function block 44 is the same as the function performed by the first function block 41. That is, the first function block 41 processes the output 8 of the detector array 5 as modified by $\sin(2\pi n/N)$ and $\cos(2\pi n/N)$ for the example given while the second function block 44 processes the output 8 of the detector array 5 as modified by $\sin(4\pi n/N)$ and $\cos(4\pi n/N)$ for the same example. Note that other signals based on the modulation signal are possible.

An output 46 of the first function block 41 is connected to an input of a first threshold detector 47. If the output 46 of the first function block 41 is above a user-definable threshold then the output 46 of the first function block 41 will appear at an output 48 of the first threshold detector 47. An output 49 of the second function block 44 is connected to an input of a second threshold detector 50. The second threshold detector 50 is functionally equivalent to the first threshold detector 47, but the user may set the thresholds of the first threshold detector 47 and the second threshold detector 50 so that the thresholds are either the same or different. The output 48 of the first threshold detector 47 and an output 51 of the second threshold detector 50 are connected to an output bus 10 of the image processor 6.

The output 8 of the detector array 5 and the output bus 10 of the image processor 6 are electrically connected to the output device 7. The output device 7 may be selected from the group consisting of a color monitor, a computer, and a transmitter. If a color monitor is used as the output device 7, any coherent light entering the present invention will be displayed on the color monitor for determining the presence and location of the coherent light. Any coherent light will be highlighted and displayed over the viewed field so that the location of the source of any coherent light may be determined. Highlighting any coherent light that may be present over the viewed field is a feature that is not available in U.S. Pat. No. 5,245,408 or in the other prior art disclosed.

What is claimed is:

1. A wide field of view coherent radiation detector and locator, comprising:

a) a collecting optic, having an optical input for receiving incoming optical radiation, having an optical output, where said collecting optic collimates incoming optical radiation;

b) an electro-optic polarization interferometer, having an optical input optically connected to the optical output of said collecting optic, having an electrical input for receiving a modulation signal, having an optical output, where said interferometer is placed at an exit pupil plane of said collecting optic;

c) an imaging optic, having an optical input optically connected to the optical output of said interferometer, and having an optical output;

d) a detector array, having an optical input optically connected to the optical output of said imaging optic, having an electrical output, where said detector array is placed one focal length away from said imaging optic;

e) an image processor, having an electrical input connected to the electrical output of said detector array, having an electrical output connected to the electrical input of said interferometer for providing the modulation signal, having an electrical output bus, where said image processor employs a down-conversion method that includes sine and cosine functions of the modulation signal; and f) an output device, having a first electrical input connected to the electrical output of said detector array, and having a second electrical input connected to the electrical output bus of said image processor wherein, said image processor comprises:

i) a first signal source, having an output at which appears the signal $\sin(2\pi n/N)$;

ii) a first multiplier, having a first input connected to the output of said detector array, having a second input connected to the output of said first signal source, and having an output;

iii) a second signal source, having an output at which appears the signal $\cos(2\pi n/N)$;

iv) a second multiplier, having a first input connected to the output of said detector array, having a second input connected to the output of said second signal source, and having an output;

v) a third signal source, having an output at which appears the signal $\sin(4\pi n/N)$;

vi) a third multiplier, having a first input connected to the output of said detector array, having a second input connected to the output of said third signal source, and having an output;

vii) a fourth signal source, having an output at which appears the signal $\cos(4\pi n/N)$;

viii) a fourth multiplier, having a first input connected to the output of said detector array, having a second input connected to the output of said fourth signal source, and having an output;

ix) a first accumulator, having an input connected to the output of said first multiplier, and having an output;

x) a second accumulator, having an input connected to the output of said second multiplier, and having an output;

xi) a third accumulator, having an input connected to the output of said third multiplier, and having an output;

xii) a fourth accumulator, having an input connected to the output of said fourth multiplier, and having an output;

xiii) a first function block, having a first input connected to the output of said first accumulator, having a second input connected to the output of said second accumulator, and having an output;

xiv) a second function block, having a first input connected to the output of said third accumulator, having a second input connected to the output of said fourth accumulator, and having an output;

xv) a first threshold detector, having an input connected to the output of said first function block, and having an output;

xvi) a second threshold detector, having an input connected to the output of said second function block, and having an output; and xvii) an output device bus connected to the output of said first threshold detector and the output of said second threshold detector.

2. The device of claim 1, wherein said collecting optic is selected from the group consisting of a single-element lens, a single-element mirror, a multi-element lens, and a multi-element mirror.

3. The device of claim 2, wherein said single-element lens is selected from the group comprising a singlet-type lens, a doublet-type lens, and a triplet-type lens.

4. The device of claim 2, wherein said multi-element lens included at least one lens selected from the group of singlet-type lens, double-type lens, and triplet-type lens.

5. The device of claim 1, wherein said collecting optic is comprised of:

a) a first lens, having an optical input, and having an optical output;

b) a field lens, having an optical input optically connected to the optical output of said first lens, and having an optical output; and c) a collimating lens, having an optical input connected to the optical output of said field lens, and having an optical output.

6. The device of claim 1, wherein said interferometer is comprised of:

a) a first polarizer, having an optical input, having an optical output;

b) a variable phase modulator, having an optical input oriented along the x-axis connected to the optical output of said first polarizer, having an electrical input for receiving the modulation signal, and having an optical output;

c) a fixed phase retarder, having an x-axis, having a y-axis, having a z-axis, having an optical input optically connected to the optical output of said variable phase modulator, and having an optical output; and d) a second polarizer, having an optical input optically connected to the optical output of said fixed phase retarder, and having an optical output.

7. The device of claim 6, wherein the optical input of said fixed phase retarder is oriented along its x-axis; wherein the optical input of said variable phase modulator is oriented along the x-axis of said fixed phase retarder; wherein said first polarizer and said second polarizer are each oriented between zero and ninety degrees, plus or minus, from the z-axis of said fixed phase retarder; wherein the thickness of the fixed phase retarder is set so that the magnitude of the difference in the optical path length of light polarized along the y-axis is longer than the coherence length of non-coherent light and shorter than the coherence length of coherent light; and wherein the height-to-length ratio of the variable phase modulator and the fixed phase retarder is greater than one.

8. The device of claim 6, wherein said first polarizer and said second polarizer are each selected from the group consisting of a prism-based polarizer and a dichroic sheet polarizer.

9. The device of claim 6, wherein said variable phase modulator is selected from the group consisting of an electro-optic modulator, a liquid crystal electro-optic modulator, a magneto-optic modulator, and a rotating fixed retarder.

10. The device of claim 6, wherein said fixed phase retarder is selected from the group consisting of a quartz fixed phase retarder, a mica fixed phase retarder, a calcite fixed phase retarder, and a lithium niobate fixed phase retarder.

11. The device of claim 1, wherein said imaging optic is selected from the group consisting of a single-element lens, a single-element mirror, a multi-element lens, and a multi-element mirror.

12. The device of claim 11, wherein said single-element lens is selected from the group comprising a singlet-type lens, a doublet-type lens, and a triplet-type lens.

13. The device of claim 11, wherein said multi-element lens included at least one lens selected from the group of singlet-type lens, double-type lens, and triplet-type lens.

14. The device of claim 11, wherein said imaging optic further includes a field lens.

15. The device of claim 1, wherein said detector array is selected from the group consisting of a charged coupled device array of W×H elements, a multi-element pin-diode array of W×H elements, and a fiber-optic array connected to W×H optical detectors.

16. The device of claim 15, wherein said charge coupled device array is selected from a group consisting of a visible light charge coupled device array and an infrared charge coupled device array.

17. The device of claim 1, wherein said first function block and said second function block each square the two inputs to the corresponding function block, add the two squared inputs, and place the square root of the summed and squared inputs at the output of the corresponding function block.

18. The device of claim 1, wherein said output device is selected from the group consisting of a monitor, a computer, and a transmitter.

19. The device of claim 18, wherein said monitor is selected from the group consisting of a color monitor and a black and white monitor.

* * * * *